United States Patent
Lai et al.

(10) Patent No.: US 9,349,172 B2
(45) Date of Patent: May 24, 2016

(54) IMAGE PROCESSING METHOD TO PERFORM IMAGE MORPHING

(71) Applicant: Institute For Information Industry, Taipei (TW)

(72) Inventors: Ching-Hao Lai, Taichung (TW); Fay Huang, Luodong Township (TW)

(73) Assignee: Institute For Information Industry, Taipei (TW)

( * ) Notice: Subject to any disclaimer, the term of this patent is extended or adjusted under 35 U.S.C. 154(b) by 0 days.

(21) Appl. No.: 14/511,156

(22) Filed: Oct. 9, 2014

(65) Prior Publication Data
US 2016/0055630 A1    Feb. 25, 2016

(30) Foreign Application Priority Data
Aug. 25, 2014  (TW) ............................. 103129184 A

(51) Int. Cl.
*G06K 9/36*      (2006.01)
*G06T 5/20*      (2006.01)

(52) U.S. Cl.
CPC ....................................... *G06T 5/20* (2013.01)

(58) Field of Classification Search
None
See application file for complete search history.

(56) References Cited

U.S. PATENT DOCUMENTS

| 5,111,516 A * | 5/1992 | Nakano ................ G06K 9/6211 382/156 |
| 2010/0104216 A1 * | 4/2010 | Ge ......................... G06K 9/342 382/284 |

\* cited by examiner

*Primary Examiner* — Eueng-Nan Yeh
(74) *Attorney, Agent, or Firm* — Skaar Ulbrich Macari, P.A.

(57) ABSTRACT

An image processing device and an image processing method thereof are provided. The image processing device uses feature points of an image to calculate weights of endpoints of straight lines in the image, and determines coordinates of the endpoints of the straight lines after image morphing. The image processing device further uses the transformed coordinates of the endpoints of the straight lines to calculate corresponding coordinates of points of the straight lines. The image processing device further uses orthogonal relation between coordinates of image points and the coordinates of points of the straight lines to add feature points, and calculates coordinates of the image points after image morphing.

5 Claims, 9 Drawing Sheets img1 img2

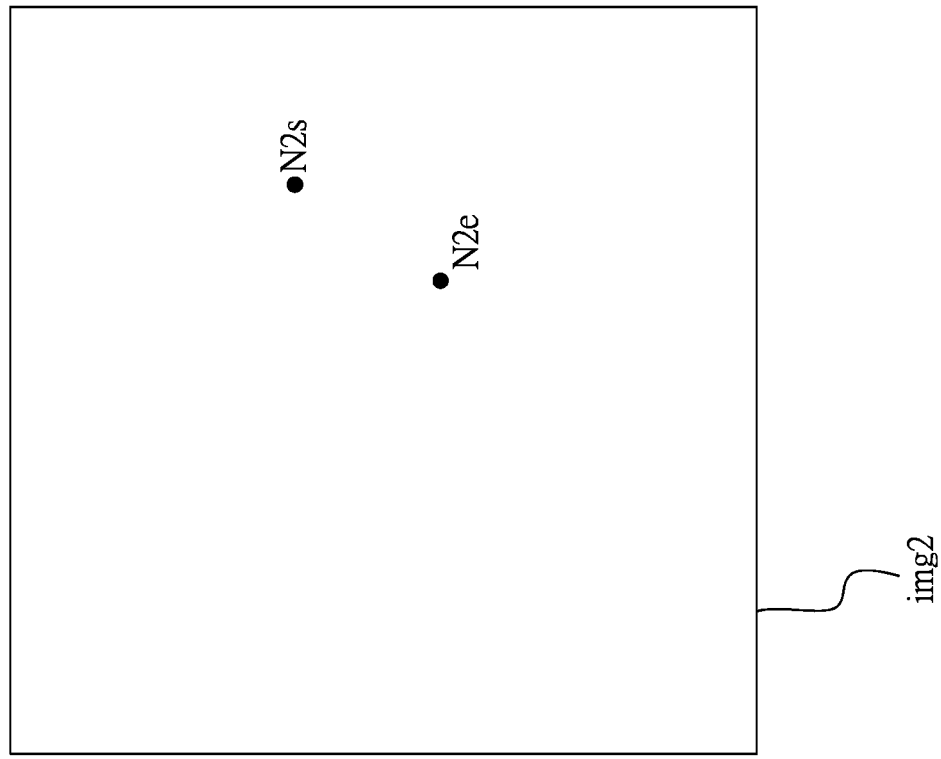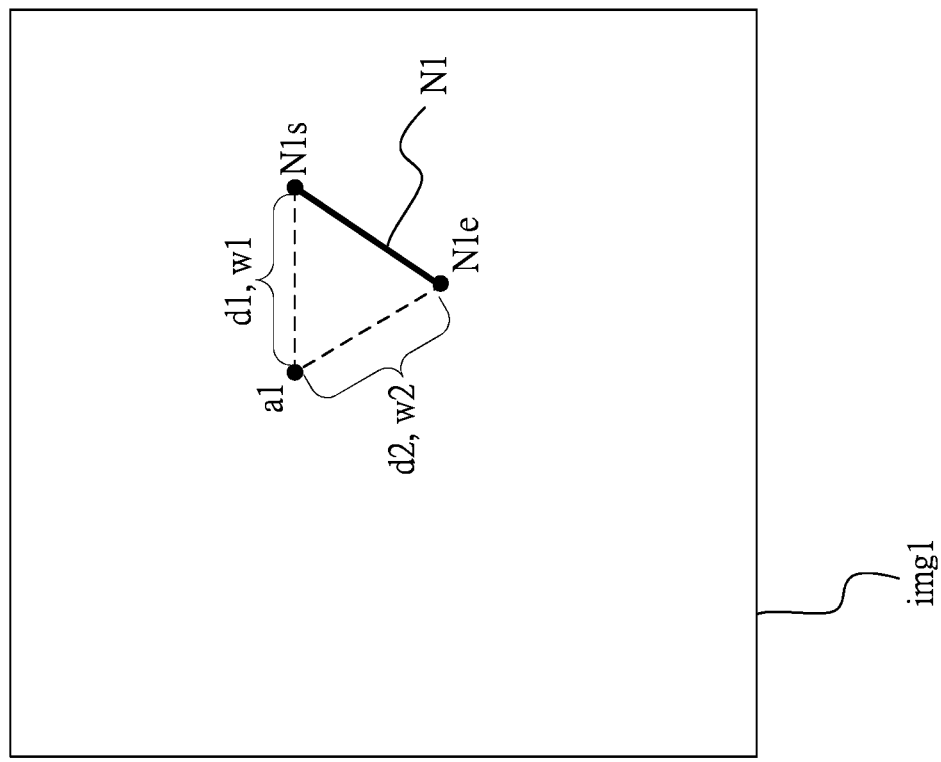
FIG. 1B

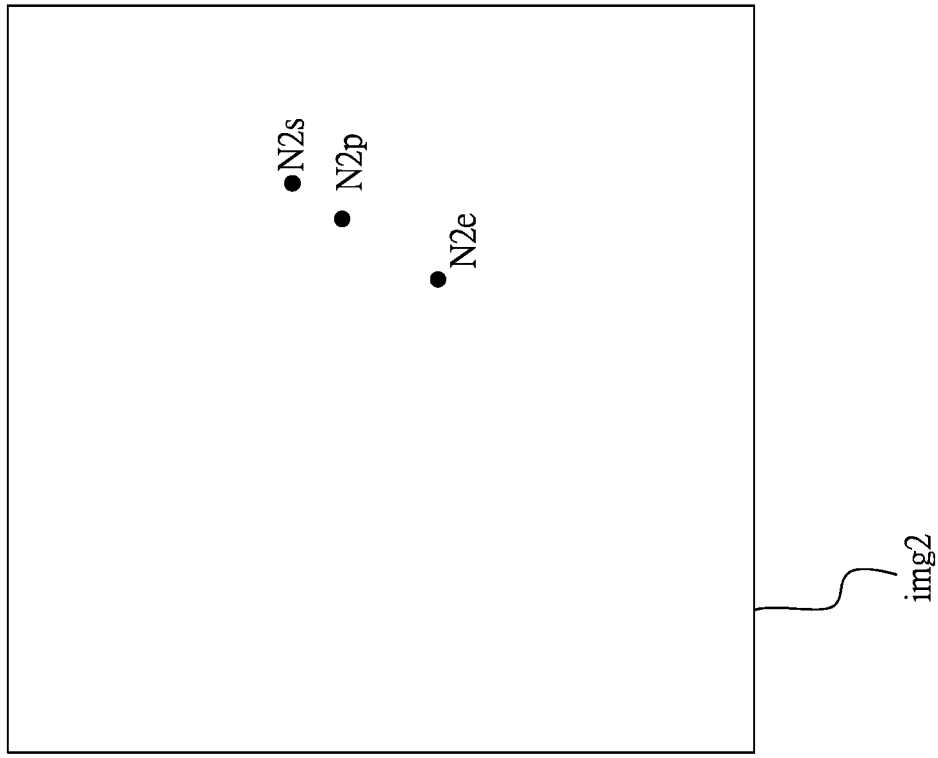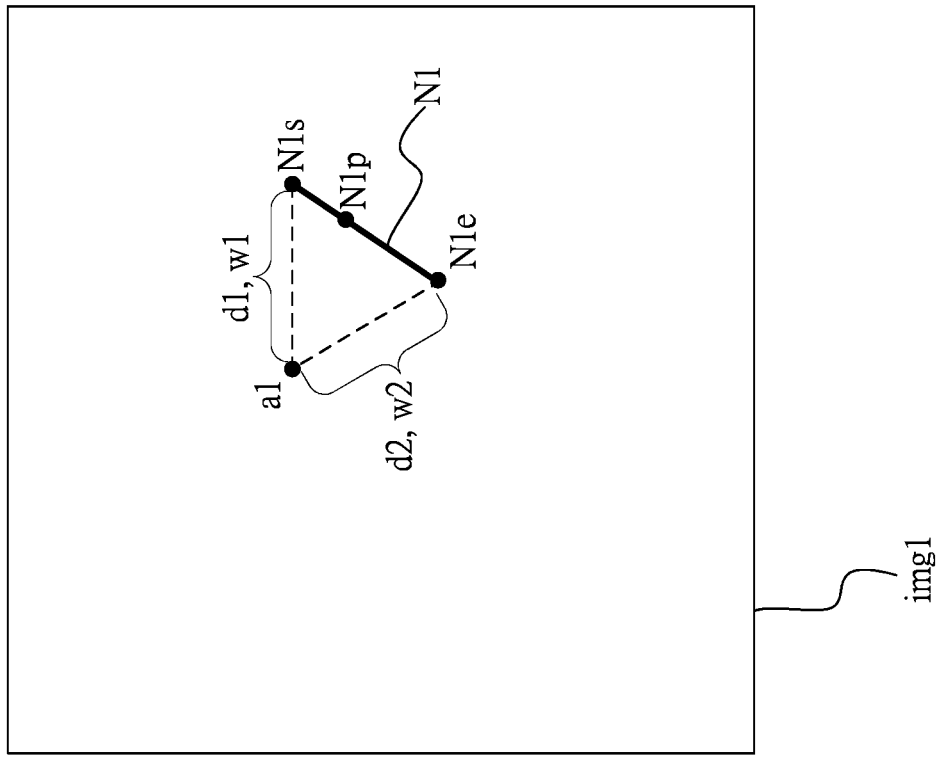
FIG. 2

```
┌─────────────────────────────────────────┐
│ Calculating a first distance between the│
│ coordinate of the first straight line   │
│ starting point and the coordinate of    │
│ the feature point                    501│
└─────────────────────────────────────────┘
                    ↓
┌─────────────────────────────────────────┐
│ Calculating a first weight of the       │
│ coordinate of the first straight line   │
│ starting point relative to the          │
│ coordinate of the feature point         │
│ according to the first distance      502│
└─────────────────────────────────────────┘
                    ↓
┌─────────────────────────────────────────┐
│ Calculating a coordinate of a second    │
│ straight line starting point in a second│
│ image relative to the coordinate of the │
│ first straight line starting point      │
│ according to the first weight        503│
└─────────────────────────────────────────┘
                    ↓
┌─────────────────────────────────────────┐
│ Calculating a second distance between   │
│ the coordinate of the first straight    │
│ line finishing point and the coordinate │
│ of the feature point                 504│
└─────────────────────────────────────────┘
                    ↓
┌─────────────────────────────────────────┐
│ Calculating a second weight of the      │
│ coordinate of the first straight line   │
│ finishing point relative to the         │
│ coordinate of the feature point         │
│ according to the second distance     505│
└─────────────────────────────────────────┘
                    ↓
┌─────────────────────────────────────────┐
│ Calculating a coordinate of a second    │
│ straight line finishing point in the    │
│ second image relative to the coordinate │
│ of the first straight line finishing    │
│ point according to the second weight 506│
└─────────────────────────────────────────┘
```

FIG. 5

```
┌─────────────────────────────────────────────────────────────┐
│ Calculating a plurality of first distances between the      │
│ coordinate of the straight line starting point and          │
│ coordinates of a plurality of feature points            601 │
└─────────────────────────────────────────────────────────────┘
                              ↓
┌─────────────────────────────────────────────────────────────┐
│ Calculating a plurality of first weights of the coordinate  │
│ of the straight line starting point relative to the         │
│ coordinates of the plurality of first feature points        │
│ according to the plurality of first distances           602 │
└─────────────────────────────────────────────────────────────┘
                              ↓
┌─────────────────────────────────────────────────────────────┐
│ Calculating a coordinate of a straight line starting point  │
│ in a second image relative to the coordinate of the         │
│ straight line starting point according to the plurality     │
│ of first weights                                        603 │
└─────────────────────────────────────────────────────────────┘
                              ↓
┌─────────────────────────────────────────────────────────────┐
│ Calculating a plurality of second distances between the     │
│ coordinate of the straight line finishing point and the     │
│ coordinates of the plurality of first feature points    604 │
└─────────────────────────────────────────────────────────────┘
                              ↓
┌─────────────────────────────────────────────────────────────┐
│ Calculating a plurality of second weights of the coordinate │
│ of the straight line finishing point relative to the        │
│ coordinates of the plurality of first feature points        │
│ according to the plurality of second distances          605 │
└─────────────────────────────────────────────────────────────┘
                              ↓
┌─────────────────────────────────────────────────────────────┐
│ Calculating a coordinate of a straight line finishing point │
│ in the second image relative to the coordinate of the       │
│ straight line finishing point according to the plurality    │
│ of second weights                                       606 │
└─────────────────────────────────────────────────────────────┘
                              ↓
┌─────────────────────────────────────────────────────────────┐
│ Calculating a distance ratio of a distance between a        │
│ coordinate of a straight line point of any of the straight  │
│ lines in the first image and a coordinate of a straight     │
│ line starting point to a distance between the coordinate    │
│ of the straight line point and a coordinate of a straight   │
│ line finishing point of the same straight line          607 │
└─────────────────────────────────────────────────────────────┘
                              ↓
┌─────────────────────────────────────────────────────────────┐
│ Calculating a corresponding coordinate of a straight line   │
│ point of the second image according to a corresponding      │
│ coordinate of a straight line starting point and a          │
│ corresponding coordinate of a straight line finishing point │
│ of the second image as well as the distance ratio       608 │
└─────────────────────────────────────────────────────────────┘
                              ↓
                             (A)    FIG. 6A
```

IMAGE PROCESSING METHOD TO PERFORM IMAGE MORPHING

PRIORITY

This application claims priority to Taiwan Patent Application No. 103129184 filed on Aug. 25, 2014, which is hereby incorporated by reference in its entirety.

FIELD

The present invention relates to an image processing device and an image processing method thereof; and more particularly, the image processing device and the image processing method thereof according to the present invention are mainly used to perform image morphing correctly on straight lines of an image.

BACKGROUND

The conventional image morphing and image fusion technologies operate mainly by firstly selecting feature points from an image and then updating coordinates of points in the image directly according to position coordinates of the feature points to obtain a new image. Additionally, there are also technologies that, directly through adjustment of grids, perform the same morphing on an image corresponding to the grids.

However, although the conventional image morphing technologies can adjust corresponding points to ideal positions, these technologies adjust the points mainly according to angles of the "points" in the image. Therefore, when an image having a straight line therein is processed by the conventional image morphing technologies, usually the straight line will be morphed into a curved line. As a result, the identifiability of the morphed image is degraded significantly to make it inconvenient for the user to view and identify the image.

Accordingly, an urgent need still exists in the art to overcome the shortcomings of the conventional technologies so that a straight line in an image can still be kept straight after the image is morphed.

SUMMARY

A primary objective of the present invention includes providing an image processing method for an image processing device. The image processing device stores a coordinate of a feature point and data of a first straight line of a first image. The data of the first straight line comprises a coordinate of a first straight line starting point and a coordinate of a first straight line finishing point. The image processing method comprises: (a) enabling the image processing device to calculate a first distance between the coordinate of the first straight line starting point and the coordinate of the feature point; (b) enabling the image processing device to calculate a first weight of the coordinate of the first straight line starting point relative to the coordinate of the feature point according to the first distance, wherein the first distance is reversely related to the first weight; (c) enabling the image processing device to calculate a coordinate of a second straight line starting point in a second image relative to the coordinate of the first straight line starting point according to the first weight; (d) enabling the image processing device to calculate a second distance between the coordinate of the first straight line finishing point and the coordinate of the feature point; (e) enabling the image processing device to calculate a second weight of the coordinate of the first straight line finishing point relative to the coordinate of the feature point according to the second distance, wherein the second distance is reversely related to the second weight; and (f) enabling the image processing device to calculate a coordinate of a second straight line finishing point in the second image relative to the coordinate of the first straight line finishing point according to the second weight.

To achieve the aforesaid objective, the present invention includes an image processing device, which comprises a storage unit and a processing unit. The storage unit is configured to store a coordinate of a feature point and data of a first straight line of a first image. Wherein, the data of the first straight line comprises a coordinate of a first straight line starting point and a coordinate of a first straight line finishing point. The processing unit is configured to: calculate a first distance between the coordinate of the first straight line starting point and the coordinate of the feature point; calculate a first weight of the coordinate of the first straight line starting point relative to the coordinate of the feature point according to the first distance, wherein the first distance is reversely related to the first weight; calculate a coordinate of a second straight line starting point in a second image relative to the coordinate of the first straight line starting point according to the first weight; calculate a second distance between the coordinate of the first straight line finishing point and the coordinate of the feature point; calculate a second weight of the coordinate of the first straight line finishing point relative to the coordinate of the feature point according to the second distance, wherein the second distance is reversely related to the second weight; and calculate a coordinate of a second straight line finishing point in the second image relative to the coordinate of the first straight line finishing point according to the second weight.

The detailed technology and preferred embodiments implemented for the subject invention are described in the following paragraphs accompanying the appended drawings for people skilled in this field to well appreciate the features of the claimed invention.

BRIEF DESCRIPTION OF THE DRAWINGS

FIG. 1B is a schematic view illustrating an image processing process according to the first embodiment of the present invention;

FIG. 2 is a schematic view illustrating an image processing process according to a second embodiment of the present invention;

FIG. 5 is a flowchart diagram of an image processing method according to a fifth embodiment of the present invention; and FIGS. 6A-6B are flowchart diagrams of an image processing method according to a sixth embodiment of the present invention.

DETAILED DESCRIPTION

Hereinbelow, the present invention will be explained with reference to example embodiments thereof. However, these example embodiments are not intended to limit the present invention to any specific examples, embodiments, environment, applications or implementations as described in these example embodiments. Therefore, description of these example embodiments is only for purpose of illustration rather than to limit the present invention.

In the following embodiments and drawings, elements not directly related to the present invention are omitted from depiction; and dimensional relationships among individual elements in the following drawings are illustrated only for ease of understanding but not to limit the actual scale.

Figure 1A:
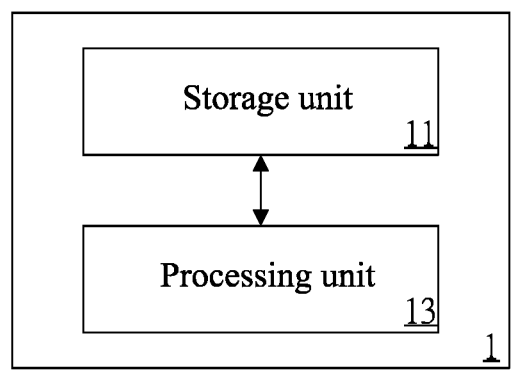
FIG. 1A is a block diagram of an image processing device according to a first embodiment of the present invention.

Referring to FIGS. 1A-1B together. FIG. 1A is a block diagram of an image processing device 1 according to a first embodiment of the present invention. FIG. 1B is a schematic view illustrating an image processing process according to the first embodiment of the present invention. The image processing device 1 comprises a storage unit 11 and a processing unit 13. The storage unit 11 stores a coordinate a1 of a feature point and data of a first straight line N1 of a first image img1. The data of the first straight line N1 comprises a coordinate N1s of a first straight line starting point and a coordinate N1e of a first straight line finishing point. The image processing process will be further described hereinbelow.

Firstly, because feature points in an image and the behaviors thereof have influences on other points in the image, the relation between the feature points and endpoints of straight lines in the original image should be firstly determined so as to calculate the corresponding endpoints of the straight lines subsequently. Specifically, the processing unit 13 of the image processing device 1 calculates a first distance d1 between the coordinate N1s of the first straight line starting point and the coordinate a1 of the feature point. Then, the processing unit 13 of the image processing device 1 calculates a first weight w1 of the coordinate N1s of the first straight line starting point relative to the coordinate a1 of the feature point according to the first distance d1.

It should be particularly emphasized that, the weight set forth herein is mainly used to determine the degree of influence of the feature points on the endpoints of the straight lines. In other words, the closer the endpoints of the straight lines are to the feature points, the greater the influence of the feature points on the endpoints of the straight lines will be. Accordingly, the value of the distance is reversely related to the priority of the weight. For example, the first weight w1 may be a value obtained by ((a length of an image diagonal−the first distance d1)/the length of the image diagonal). However, it should be appreciated that, this is only for the purpose of illustrating how to calculate the weight, but is not intended to limit the calculating manner of the weight of the present invention; and other implementations to calculate the weight can be devised by those skilled in the art based on what is described above.

Then, the processing unit 13 of the image processing device 1 calculates a coordinate N2s of a second straight line starting point in a second image img2 relative to the coordinate N1s of the first straight line starting point according to the first weight w1. In other words, the coordinate N2s of the second straight line starting point is the coordinate in a new image that is obtained by performing image processing or image morphing on the coordinate N1s of the first straight line starting point.

Similarly, the processing unit 13 of the image processing device 1 calculates a second distance d2 between the coordinate N1e of the first straight line finishing point and the coordinate a1 of the feature point. Then, the processing unit 13 of the image processing device 1 calculates a second weight w2 of the coordinate N1e of the first straight line finishing point relative to the coordinate a1 of the feature point according to the second distance d2. Similarly, the second distance d2 is reversely related to the second weight w2.

Then, the processing unit 13 of the image processing device 1 calculates a coordinate N2e of a second straight line finishing point in the second image img2 relative to the coordinate N1e of the first straight line finishing point according to the second weight w2. In other words, the coordinate N2e of the second straight line finishing point is the coordinate in the new image that is obtained by performing image processing or image morphing on the coordinate N1e of the first straight line finishing point.

In this way, weight relations between the endpoints of the straight lines and the feature points can be calculated according to the distances therebetween, and the coordinates of the endpoints of the straight lines in a new image can be adjusted according to the weight relations so that information about the endpoints of the straight lines after the image morphing can be preliminarily obtained.

FIG. 2 is a schematic view illustrating an image processing process according to a second embodiment of the present invention. It should be particularly appreciated that, the second embodiment has the same architecture as the aforesaid embodiment, so elements bearing the same reference numerals also have the same functions and will not be further described herein. In the second embodiment, the data N1 of the first straight line further comprises a coordinate N1p of a first straight line point, which is any point on the straight line that is different from the feature points (e.g., the coordinate a1 of the feature point). The second embodiment is mainly used to further describe the image processing manner of other points on the straight lines than the starting points and the finishing points.

Specifically, the processing unit 13 of the image processing device 1 firstly calculates a distance ratio (not depicted) of a distance between the coordinate N1p of the first straight line point and the coordinate N1s of the first straight line starting point to a distance between the coordinate N1p of the first straight line point and the coordinate N1e of the first straight line finishing point. The distance ratio may be a ratio of a line section formed by the coordinate N1s of the first straight line starting point and the coordinate N1p of the first straight line point to a line section formed by the coordinate N1p of the first straight line point and the coordinate N1e of the first straight line finishing point.

Then, after the distance ratio of the distance of the coordinate N1p of the first straight line point and the coordinate N1s of the first straight line starting point to the distance of the coordinate N1p of the first straight line point and the coordinate N1e of the first straight line finishing point in the first image img1 is obtained through calculation, the processing unit 13 of the image processing device 1 can then calculate a corresponding coordinate N2p of a second straight line point in the second image img2 according to the values of the coordinate N2s of the second straight line starting point and the coordinate N1e of the second straight line finishing point as well as the distance ratio.

For example, the ratio of the line section formed by the coordinate N1s of the first straight line starting point and the coordinate N1p of the first straight line point to the line section formed by the coordinate N1p of the first straight line point and the coordinate N1e of the first straight line finishing point is equal to a ratio of a line section formed by the coordinate N2s of the second straight line starting point and the coordinate N2p of the second straight line finishing point to a line section formed by the coordinate N2p of the second straight line point and the coordinate N2e of the second straight line finishing point.

Accordingly, the image transforming can be performed on any point of the first straight line in the first image img1 in the aforesaid manner to obtain all the corresponding straight line points that between the coordinate N2s of the second straight line starting point and the coordinate N2e of the second straight line finishing point in the second image img2 after the image transforming.

Figure 3:
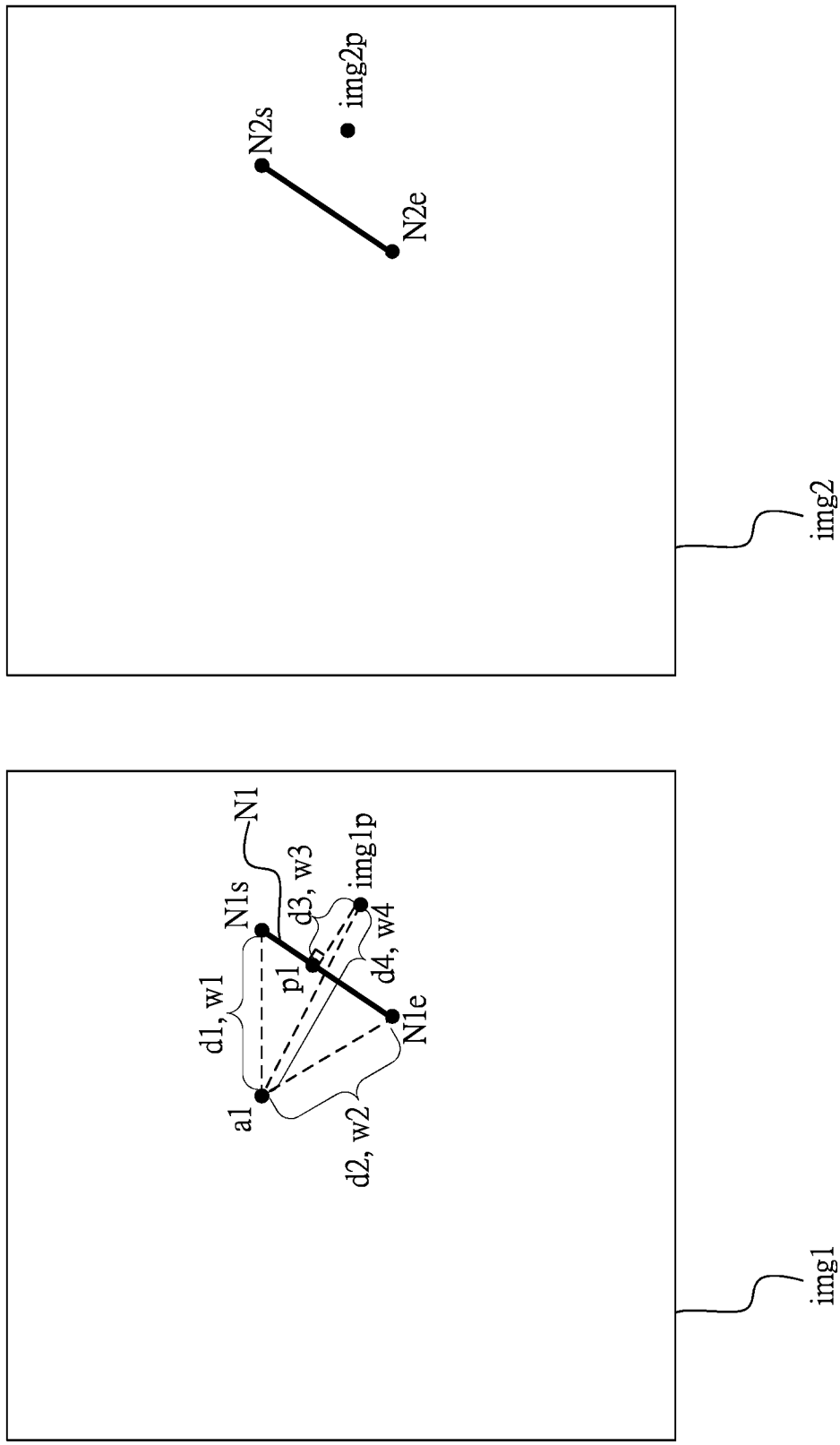
FIG. 3 is a schematic view illustrating an image processing process according to a third embodiment of the present invention.

FIG. 3 is a schematic view illustrating an image processing process according to a third embodiment of the present invention. It should be particularly appreciated that, the third embodiment has the same architecture as the aforesaid embodiments, so elements bearing the same reference numerals also have the same functions and will not be further described herein. In the third embodiment, the first image img1 further comprises a coordinate img1p of a first image point. The coordinate img1p of the first image point is any point of the first image img1 that is different from the feature points (e.g., the coordinate a1 of the feature point) and the straight line points (e.g., the coordinate N1p of the first straight line point). The third embodiment is mainly used to further describe the transforming manner of general points (points other than the feature points and the points on the straight lines) in the image.

Specifically, in order to maintain the features of the straight lines in the image after the image morphing, the correspondence relations between points highly related to the straight lines and the straight lines should be adjusted. Further speaking, the processing unit 13 of the image processing device 1 firstly determines whether there is a first correspondence relation (not depicted) between the coordinate img1p of the first image point and the line section formed by the coordinate N1s of the first straight line starting point and the coordinate N1e of the first straight line finishing point. In other words, whether there is the first correspondence relation between the coordinate img1p of the first image point and a first line section N1 is determined.

If the determination result is "yes", the processing unit 13 of the image processing device 1 calculates a first projection point p1 of the coordinate img1p of the first image point relative to the line section (i.e., the first straight line N1) formed by the coordinate N1s of the first straight line starting point and the coordinate N1e of the first straight line finishing point. Then for the coordinate img1p of the first image point, the first projection point p1 is considered as one of the feature points.

Accordingly, the processing unit 13 of the image processing device 1 calculates a third distance d3 between the coordinate img1p of the first image point and the coordinate of the feature point a1 and a fourth distance d4 between the coordinate img1p of the first image point and the first projection point p1 respectively. Then, similarly, the image processing unit 13 of the image processing device 1 calculates a third weight w3 and a fourth weight w4 of the coordinate img1p of the first image point relative to the coordinate a1 of the feature point and the first projection point p1 respectively according to the third distance d3 and the fourth distance d4. Similarly, the third distance d3 is reversely related to the third weight w3 and the fourth distance d4 is reversely related to the fourth weight w4.

Then, similarly, the processing unit 13 of the image processing device 1 can calculate a coordinate img2p of a second image point in the second image img2 relative to the coordinate img1p of the first image point according to the third weight w3 and the fourth weight w4. In other words, the coordinate img2p of the second image point is just the coordinate in a new image that is obtained by performing image transforming or image morphing on the coordinate img1p of the first image point.

On the other hand, if there is no correspondence relation between the coordinate img1p of the first image point and the first line section N1, then the feature point a1 is directly used to calculate the weight of the coordinate img1p of the first image point and then perform image transforming thereon. In this way, the image transforming can be performed on any point (other than the feature points and the points on the straight lines) in the first image img1 in the aforesaid manner to obtain all the corresponding image points that have been transformed in the second image img2.

It should be particularly appreciated that, those skilled in the art can easily understand that the aforesaid correspondence relations may be relations of threshold conditions such as the distance and the position correspondence relations between points and lines, and taking the projection point as the feature point for calculating the weight makes the points and the lines being more highly correlated with each other. When there is an orthogonal relation between a point and a line, the relation therebetween is very high because the distance therebetween is the shortest; and then when an orthogonal projection point of the point on the line is used as the feature point to calculate the weight, the relation between the point and the line will be the highest. However, this is not intended to limit the implementations of the present invention.

Figure 4A:
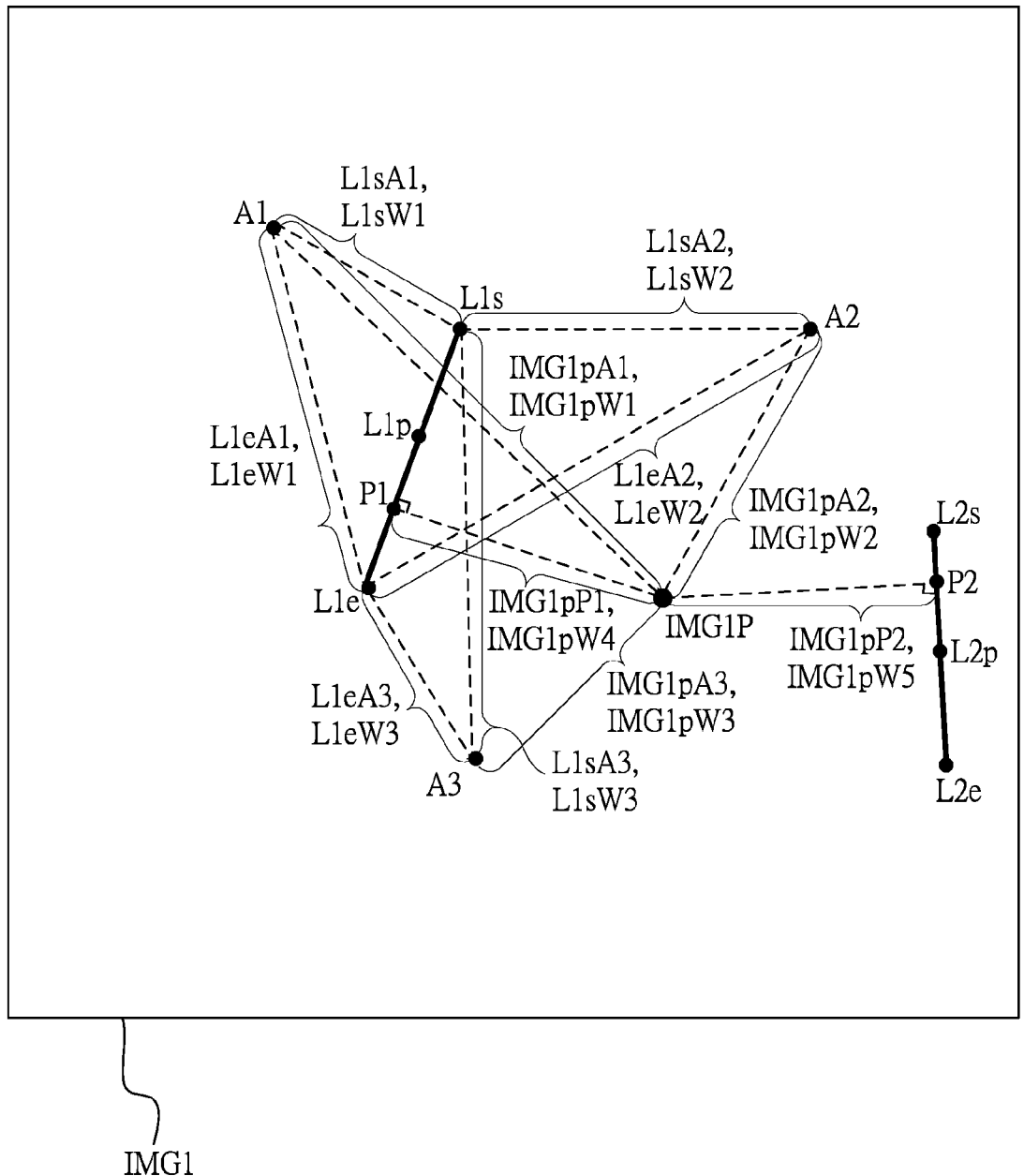
FIGS. 4A-4B are schematic views illustrating image processing processes according to a fourth embodiment of the present invention.
Figure 4B:
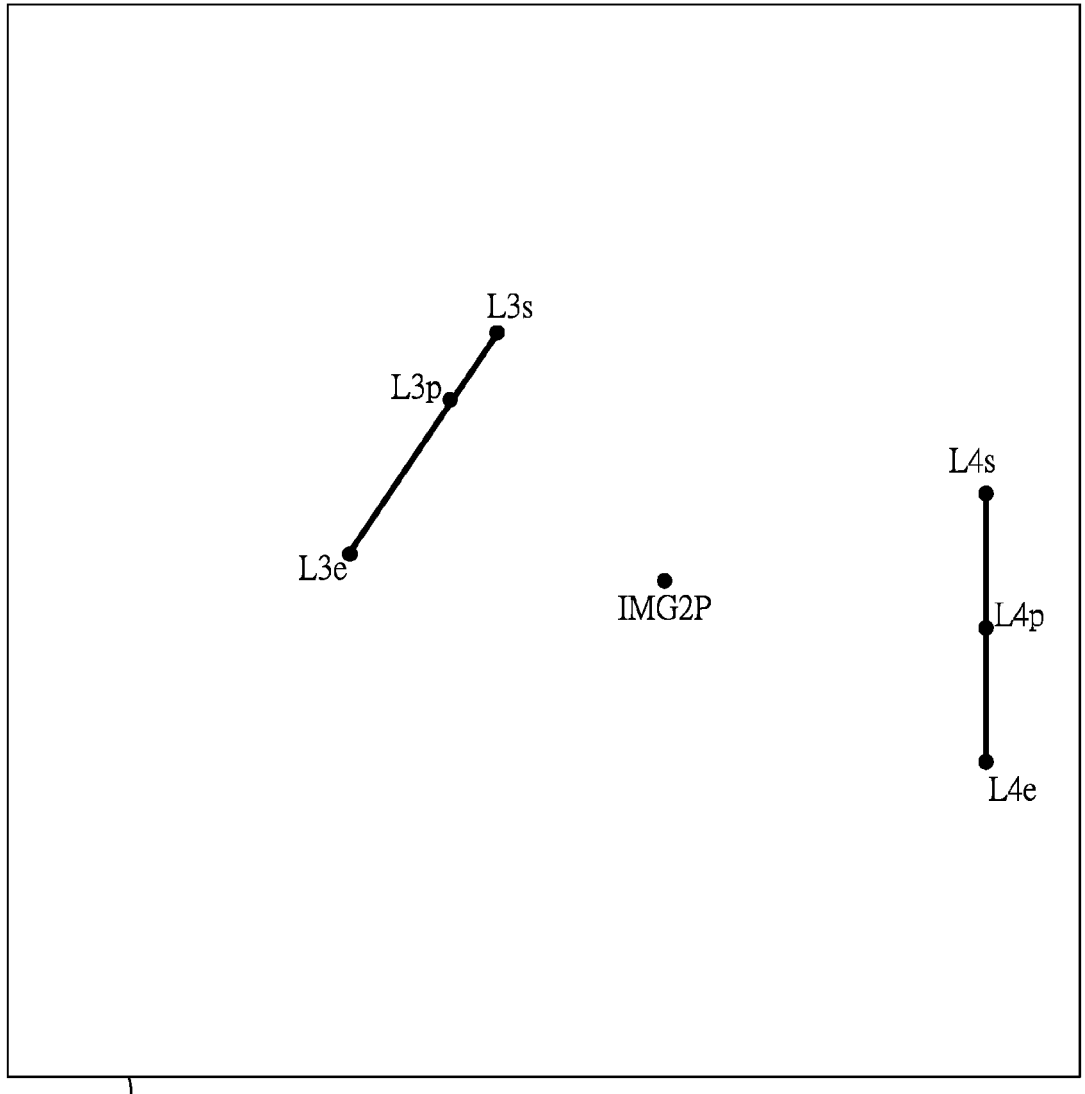

FIGS. 4A-4B are schematic views illustrating image processing processes according to a fourth embodiment of the present invention. It should be particularly appreciated that, the fourth embodiment has the same architecture as the aforesaid embodiments, so elements bearing the same reference numerals also have the same functions. The fourth embodiment is mainly used to illustrate how to perform the image transforming when there are a plurality of feature points and a plurality of straight line sections in an image. The storage unit 11 stores coordinates A1, A2, and A3 of a plurality of feature points and data L1 and L2 of a plurality of straight lines of a first image IMG1. The data L1 of a straight line comprises a coordinate L1s of a straight line starting point and a coordinate L1e of a straight line finishing point, and the data L2 of a straight line comprises a coordinate L2s of a straight line starting point and a coordinate L2e of a straight line finishing point.

Firstly, the processing unit 13 of the image processing device 1 calculates a distance L1sA1 between the coordinate L1s of the straight line starting point and the coordinate A1 of a feature point, a distance L1sA2 between the coordinate L1s of the straight line starting point and the coordinate A2 of a feature point, and a distance L1sA3 between the coordinate L1s of the straight line starting point and the coordinate A3 of a feature point respectively. Then, the processing unit 13 of the image processing device 1 calculates weights L1sW1, L1sW2, and L1sW3 of the coordinate L1s of the straight line starting point relative to the coordinates A1, A2, and A3 of the feature points respectively according to the distances L1sA1, L1sA2, and L1sA3.

Then, the processing unit 13 of the image processing device 1 calculates a coordinate L3s of a straight line starting point in a second image IMG2 relative to the coordinate L1s of the straight line starting point according to the weights L1sW1, L1sW2, and L1sW3. In other words, the coordinate L3s of the straight line starting point is the coordinate in a new image that is obtained by performing image processing or image morphing on the coordinate L1$s$ of the straight line starting point.

Similarly, the processing unit 13 of the image processing device 1 calculates a distance L1$e$A1 between the coordinate L1$e$ of the straight line finishing point and the coordinate A1 of the feature point, a distance L1$e$A2 between the coordinate L1$e$ of the straight line finishing point and the coordinate A2 of the feature point, and a distance L1$e$A3 between the coordinate L1$e$ of the straight line finishing point and the coordinate A3 of the feature point. Then, the processing unit 13 of the image processing device 1 calculates weights L1$e$W1, L1$e$W2 and L1$e$W3 of the coordinate L1$e$ of the straight line finishing point relative to the coordinates A1, A2, and A3 of feature points respectively according to the distances L1$e$A1, L1$e$A2, and L1$e$A3.

Then, the processing unit 13 of the image processing device 1 calculates a coordinate L3$e$ of a straight line finishing point in the second image IMG2 relative to the coordinate L1$e$ of the straight line finishing point of the first image IMG1 according to the weights L1$e$W1, L1$e$W2 and L1$e$W3. In other words, the coordinate L3$e$ of the straight line finishing point is just the coordinate in the new image that is obtained by performing image processing or image morphing on the coordinate L1$e$ of the straight line finishing point.

Similarly, in the aforesaid manner, the processing unit 13 of the image processing device 1 can also calculate a coordinate L4$s$ of a straight line starting point and a coordinate L4$e$ of a straight line finishing point in the second image IMG2 for the data of the straight line L2. Accordingly, the distances between the endpoints of the straight lines and the feature points can be used to calculate weight relations, and then the coordinates of the endpoints of the straight lines in the new image can be adjusted according to the weight relations so that information about the endpoints of the straight lines after image morphing can be preliminarily obtained.

Then, for the points in the data L1 of the straight line, the processing unit 13 of the image processing device 1 calculates a distance ratio of a distance between a coordinate L1$p$ of a straight line point and the coordinate L1$s$ of the straight line starting point to a distance between the coordinate L1$p$ of a straight line point and the coordinate L1$e$ of the straight line finishing point, and then calculates a coordinate L3$p$ of a straight line point in the second image IMG2 corresponding to the coordinate L1$p$ of the straight line point according to values of the coordinate L3$s$ of the straight line starting point and the coordinate L3$e$ of the straight line finishing point as well as the distance ratio.

In this way, the image transforming can be performed on any point on the straight line represented by the data of the straight line L1 in the first image IMG1 in the aforesaid manner to obtain all the corresponding straight line points between the coordinate L3$s$ of the straight line starting point and the coordinate L3$e$ of the straight line finishing point in the second image IMG2 after the image transforming.

Similarly, for the points in the data L2 of the straight line, the processing unit 13 of the image processing device 1 calculates a distance ratio of a distance between a coordinate L2$p$ of a straight line point and the coordinate L2$s$ of the straight line starting point to a distance between the coordinate L2$p$ of a straight line point and the coordinate L2$e$ of the straight line finishing point, and then calculates a coordinate L4$p$ of a straight line point in the second image IMG2 corresponding to the coordinate L2$p$ of the straight line point according to values of the coordinate L4$s$ of the straight line starting point and the coordinate L4$e$ of the straight line finishing point as well as the distance ratio.

In this way, the image transforming can be performed on any point on the straight line represented by the data L2 of the straight line in the first image IMG1 in the aforesaid manner to obtain all the corresponding straight line points between the coordinate L4$s$ of the straight line starting point and the coordinate L4$e$ of the straight line finishing point in the second image IMG2 after the image transforming.

Then, the general image points other than the feature points and the points on the straight lines are transformed. Specifically, the processing unit 13 of the image processing device 1 determines whether there is a correspondence relation (e.g., an orthogonal relation) between the coordinate of the first image point IMG1$p$ and the line sections represented by the data L1 of the straight line and the data L2 of the straight line.

Accordingly, assume that the processing unit 13 of the image processing device 1 determines that there is a first correspondence relation between the coordinate IMG1$p$ of the first image point and the line section represented by the data L1 of the straight line and a second correspondence relation between the coordinate IMG1$p$ of the first image point and the line section represented by the data L2 of the straight line respectively, and the processing unit 13 can further calculate a projection point P1 and a projection point P2 (e.g., orthogonal projection points) of the coordinate IMG1$p$ of the first image point relative to the line sections represented by the data L1 of the straight line and the data L2 of the straight line respectively. Then for the coordinate IMG1$p$ of the first image point, the orthogonal projection points P1 and P2 are considered as feature points.

The processing unit 13 of the image processing device 1 calculates distances IMG1$p$A1, IMG1$p$A2, IMG1$p$A3, IMG1$p$P1 and IMG1$p$P2 between the coordinate IMG1$p$ of the first image point and the coordinates A1, A2, and A3 of the feature points, and the projection points P1 and P2 respectively. Then, similarly, the processing unit 13 of the image processing device 1 calculates weights IMG1$p$W1, IMG1$p$W2, IMG1$p$W3, IMG1$p$W4 and IMG1$p$W5 of the coordinate IMG1$p$ of the first image point relative to the coordinates A1, A2, and A3 of the feature points, and the projection points P1 and P2 respectively according to the distances IMG1$p$A1, IMG1$p$A2, IMG1$p$A3, IMG1$p$P1 and IMG1$p$P2.

Then, similarly, the processing unit 13 of the image processing device 1 can calculate a coordinate IMG2$p$ of a second image point in the second image IMG2 relative to the coordinate IMG1$p$ of the first image point according to the weights IMG1$p$W1, IMG1$p$W2, IMG1$p$W3, IMG1$p$W4 and IMG1$p$W5. In other words, the coordinate IMG2$p$ of the second image point is just the coordinate in the new image that is obtained by performing image processing or image morphing on the coordinate IMG1$p$ of the first image point.

In this way, the image transforming can be performed on any point (different from the feature points and the points on the straight lines) in the first image IMG1 in the aforesaid manner to obtain all the corresponding image points in the second image IMG2 after the image transforming.

It should be particularly appreciated that, technologies that are related to images such as determining feature points (e.g., the scale-invariant feature transform), detecting straight lines (e.g., the hough transform, the canny edge detection, and the sobel operator), using weights, determining projection points and the like are well known to those skilled in the art, so they will not be further described herein. The present invention mainly focuses on technologies related to the transforming of straight lines.

A fifth embodiment of the present invention is an image processing method, a flowchart diagram of which is shown in FIG. 5. The method of the fifth embodiment is used in an image processing device (e.g., the image processing device 1 in the aforesaid embodiments). The image processing device stores a coordinate of a feature point and data of a first straight line of a first image. The data of the first straight line comprises a coordinate of a first straight line starting point and a coordinate of a first straight line finishing point. The detailed steps of the fifth embodiment are described as follows.

Firstly, a step 501 is executed to enable the image processing device to calculate a first distance between the coordinate of the first straight line starting point and the coordinate of the feature point. A step 502 is executed to enable the image processing device to calculate a first weight of the coordinate of the first straight line starting point relative to the coordinate of the feature point according to the first distance. The first distance is reversely related to the first weight. A step 503 is executed to enable the image processing device to calculate a coordinate of a second straight line starting point in a second image relative to the coordinate of the first straight line starting point according to the first weight.

Then, a step 504 is executed to enable the image processing device to calculate a second distance between the coordinate of the first straight line finishing point and the coordinate of the feature point. A step 505 is executed to enable the image processing device to calculate a second weight of the coordinate of the first straight line finishing point relative to the coordinate of the feature point according to the second distance. The second distance is reversely related to the second weight. Finally, a step 506 is executed to enable the image processing device to calculate a coordinate of a second straight line finishing point in the second image relative to the coordinate of the first straight line finishing point according to the second weight.

Figure 6B:
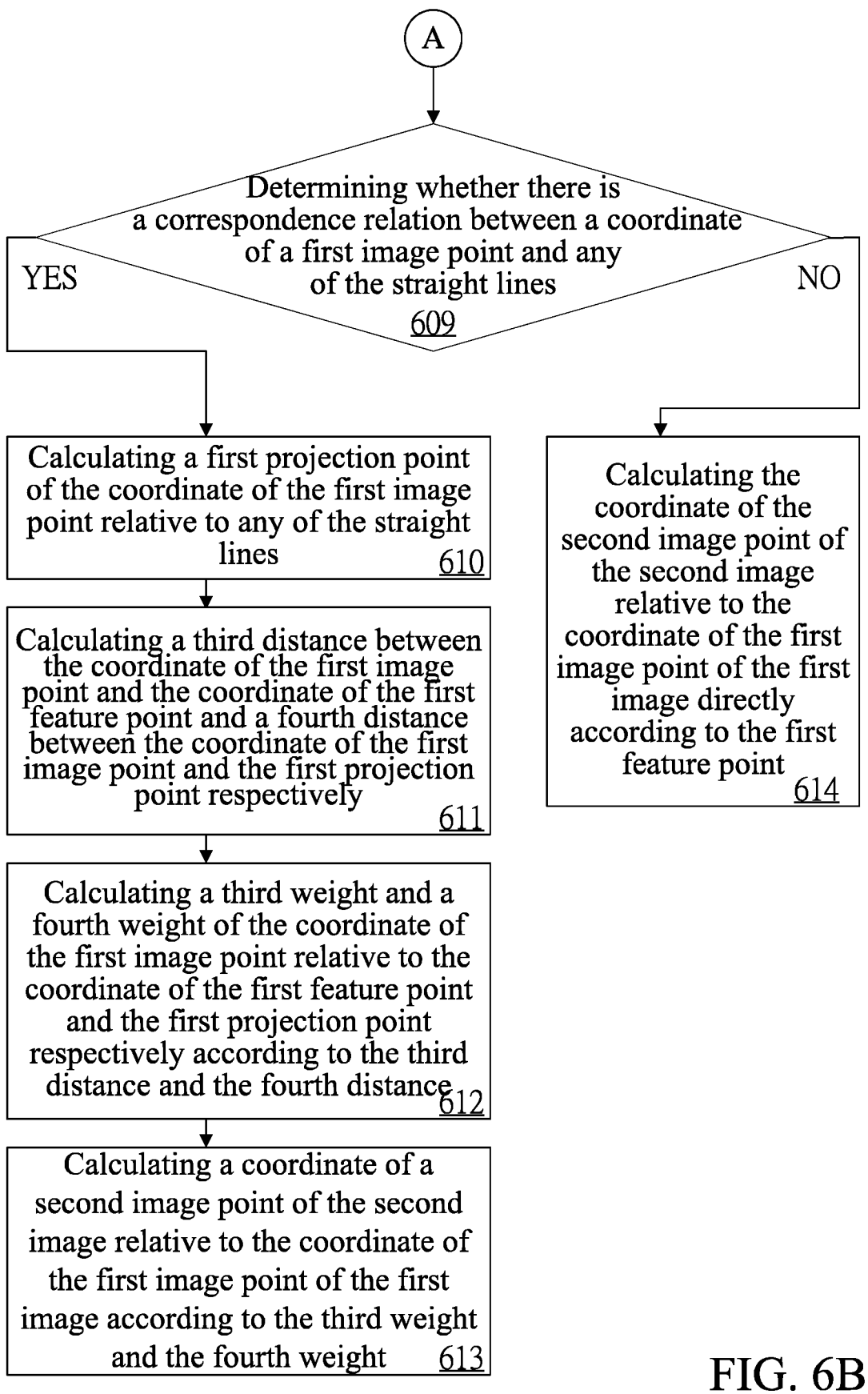

A sixth embodiment of the present invention is an image processing method, a flowchart diagram of which is shown in FIGS. 6A~6B. The method of the sixth embodiment is used in an image processing device (e.g., the image processing device 1 in the aforesaid embodiments). The image processing device stores coordinates of a plurality of feature points and data of a plurality of straight lines of a first image. The data of each of the straight lines comprises a coordinate of a straight line starting point, a coordinate of a straight line finishing point and coordinates of a plurality of straight line points that are different from the coordinates of the feature points. The detailed steps of the sixth embodiment are described as follows.

Firstly, a step 601 is executed to enable the image processing device to calculate a plurality of first distances between the coordinate of any straight line starting point and coordinates of a plurality of feature points. A step 602 is executed to enable the image processing device to calculate a plurality of first weights of the coordinate of the straight line starting point relative to the coordinates of the plurality of feature points according to the plurality of first distances. The distances are reversely related to the weights. A step 603 is executed to enable the image processing device to calculate a coordinate of a straight line starting point of a second image relative to the coordinate of the straight line starting point of the first image according to the plurality of first weights.

Then, a step 604 is executed to enable the image processing device to calculate a plurality of second distances between the coordinate of the straight line finishing point and coordinates of a plurality of feature points. A step 605 is executed to enable the image processing device to calculate a plurality of second weights of the coordinate of the straight line finishing point relative to the coordinates of the plurality of feature points according to the plurality of second distances. Similarly, the distances are reversely related to the weights. A step 606 is executed to enable the image processing device to calculate a coordinate of a straight line finishing point of the second image relative to the coordinate of the straight line finishing point of the first image according to the plurality of second weights.

It should be particularly appreciated that, in the sixth embodiment, the first image has a plurality of straight lines, so the steps 601~606 are repeated until the starting points and the finishing points of all the straight lines in the image have been transformed.

After the starting points and the finishing points of all the straight lines in the first image are obtained through calculation, a step 607 is executed to enable the image processing device to calculate a distance ratio of a distance between a coordinate of a straight line point of any of the straight lines and a coordinate of a straight line starting point to a distance between the coordinate of the straight line point of the straight line and a coordinate of a straight line finishing point of the same straight line. A step 608 is executed to enable the image processing device to calculate a corresponding coordinate of a straight line point of the second image according to a corresponding coordinate of a straight line starting point and a corresponding coordinate of a straight line finishing point of the second image as well as the distance ratio.

Similarly, each straight line in the first image has coordinates of a plurality of straight line points, so the steps 607~608 are repeated until the coordinate of each straight line point of each straight line have been transformed.

Then, a step 609 is executed to enable the image processing device to determine whether there is a correspondence relation between a coordinate of a first image point, which is different from the coordinates of the straight line points and the coordinates of the feature points, and any of the straight lines. If the determination result is "yes", a step 610 is executed to enable the image processing device to calculate a first projection point of the coordinate of the first image point relative to any of the straight lines. A step 611 is executed to enable the image processing device to calculate a third distance between the coordinate of the first image point and the coordinate of the feature point and a fourth distance between the coordinate of the first image point and the first projection point respectively.

Then, a step 612 is executed to enable the image processing device to calculate a third weight and a fourth weight of the coordinate of the first image point relative to the coordinate of the feature point and the first projection point respectively according to the third distance and the fourth distance. A step 613 is executed to enable the image processing device to calculate a coordinate of a second image point of the second image relative to the coordinate of the first image point of the first image according to the third weight and the fourth weight.

On the other hand, if there is no correspondence relation between the coordinate of the first image point, which is different from the coordinates of the straight line points and the coordinates of the feature points, and any of the straight lines, then a step 614 is executed to enable the image processing device to calculate the coordinate of the second image point of the second image relative to the coordinate of the first image point of the first image directly according to the feature point. Similarly, the first image has coordinates of a plurality of first image points therein, so the steps 609~614 are repeated until the coordinate of each image point in the first image has been transformed. Similarly, the correspondence relation may be an orthogonal relation.

According to the above descriptions, the image processing device and the image processing method thereof according to the present invention can transform the coordinates according to the features of straight lines in the image, and can maintain the features of the straight lines according to the projection points of the coordinates relative to the straight lines so as to ensure that the features of the straight lines are maintained after the image transforming.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An image processing method for an image processing device, the image processing device storing a coordinate of a feature point and data of a first straight line of a first image, and the data of the first straight line comprising a coordinate of a first straight line starting point and a coordinate of a first straight line finishing point, the image processing method comprising:
    (a) the image processing device calculating a first distance between the coordinate of the first straight line starting point and the coordinate of the feature point;
    (b) the image processing device calculating a first weight of the coordinate of the first straight line starting point relative to the coordinate of the feature point according to the first distance, wherein the first distance is reversely related to the first weight;
    (c) the image processing device calculating a coordinate of a second straight line starting point in a second image relative to the coordinate of the first straight line starting point according to the first weight;
    (d) the image processing device calculating a second distance between the coordinate of the first straight line finishing point and the coordinate of the feature point;
    (e) the image processing device calculating a second weight of the coordinate of the first straight line finishing point relative to the coordinate of the feature point according to the second distance, wherein the second distance is reversely related to the second weight; and
    (f) the image processing device calculating a coordinate of a second straight line finishing point in the second image relative to the coordinate of the first straight line finishing point according to the second weight.

2. The image processing method as claimed in claim 1, wherein the data of the first straight line further comprises a coordinate of a first straight line point which is different from the coordinate of the feature point, the image processing method further comprising:
    (g) the image processing device calculating a distance ratio of a distance between the coordinate of the first straight line point and the coordinate of the first straight line starting point to a distance between the coordinate of the first straight line point and the coordinate of the first straight line finishing point; and
    (h) the image processing device calculating a coordinate of a second straight line point of the second image according to the coordinate of the second straight line starting point, the coordinate of the second straight line finishing point and the distance ratio.

3. The image processing method as claimed in claim 2, wherein the first image further comprises a coordinate of a first image point which is different from the coordinate of the feature point and the coordinate of the first straight line point, the image processing method further comprising:
    (i) the image processing device to determine a first correspondence relation between the coordinate of the first image point and a line section formed by the coordinate of the first straight line starting point and the coordinate of the first straight line finishing point;
    (j) the image processing device calculating a first projection point of the coordinate of the first image point relative to the line section formed by the coordinate of the first straight line starting point and the coordinate of the first straight line finishing point according to the first correspondence relation;
    (k) the image processing device calculating a third distance between the coordinate of the first image point and the coordinate of the feature point and a fourth distance between the coordinate of the first image point and the first projection point respectively;
    (l) the image processing device calculating a third weight and a fourth weight of the coordinate of the first image point relative to the coordinate of the feature point and the first projection point respectively according to the third distance and the fourth distance, wherein the third distance is reversely related to the third weight and the fourth distance is reversely related to the fourth weight; and
    (m) the image processing device calculating a coordinate of a second image point of the second image relative to the coordinate of the first image point according to the third weight and the fourth weight.

4. The image processing method as claimed in claim 3, wherein the image processing device further stores data of a third straight line of the first image, and the data of the third straight line comprises a coordinate of a third straight line starting point and a coordinate of a third straight line finishing point, the image processing method further comprising the following steps after the step (j):
    (j1) the image processing device determining a second correspondence relation between the coordinate of the first image point and a line section formed by the coordinate of the third straight line starting point and the coordinate of the third straight line finishing point; and
    (j2) the image processing device calculating a third projection point of the coordinate of the first image point relative to the line section formed by the coordinate of the third straight line starting point and the coordinate of the third straight line finishing point according to the second correspondence relation;
    wherein the step (k) further comprises:
    (k1) the image processing device calculating the third distance, the fourth distance and a fifth distance between the coordinate of the first image point and the coordinate of the feature point, the first projection point and the third projection point respectively;
    wherein the step (l) further comprises:
    (l1) the image processing device calculating the third weight, the fourth weight and a fifth weight of the coordinate of the first image point relative to the coordinate of the feature point, the first projection point and the third projection point respectively according to the third distance, the fourth distance and the fifth distance, wherein the third distance is reversely related to the third weight, the fourth distance is reversely related to the fourth weight, and the fifth distance is reversely related to the fifth weight;
    and wherein the step (m) further comprises:

(m1) the image processing device calculating the coordinate of the second image point of the second image relative to the coordinate of the first image point according to the third weight, the fourth weight and the fifth weight.

5. The image processing method as claimed in claim 4, wherein the first correspondence relation and the second correspondence relation are orthogonal relations.

* * * * *